United States Patent
Ma et al.

(10) Patent No.: US 10,601,356 B2
(45) Date of Patent: Mar. 24, 2020

(54) FREQUENCY CONVERTER, BYPASS FREQUENCY CONVERSION CONTROL SYSTEM AND SWITCHING CONTROL METHOD THEREOF

(71) Applicant: Otis Elevator Company, Farmington, CT (US)

(72) Inventors: Kun Ma, Shanghai (CN); Chen Gao, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/129,406

(22) Filed: Sep. 12, 2018

(65) Prior Publication Data

US 2019/0089284 A1     Mar. 21, 2019

(30) Foreign Application Priority Data

Sep. 15, 2017   (CN) .......................... 2017 1 0831644

(51) Int. Cl.
*H02P 27/04*     (2016.01)
*B66B 25/00*     (2006.01)
(Continued)

(52) U.S. Cl.
CPC ............ *H02P 27/047* (2013.01); *B66B 25/00* (2013.01); *H02P 1/30* (2013.01); *H02P 1/52* (2013.01);
(Continued)

(58) Field of Classification Search
CPC ..................................................... H02P 27/047
(Continued)

(56) References Cited

U.S. PATENT DOCUMENTS

| 4,843,296 A * | 6/1989 | Tanaka ................. H02M 5/271 318/800 |
| 5,804,953 A * | 9/1998 | Bowyer .................. H02M 1/10 323/256 |

(Continued)

FOREIGN PATENT DOCUMENTS

| CN | 201415910 Y | 10/2003 |
| CN | 101054148 B | 9/2010 |

(Continued)

OTHER PUBLICATIONS

European Search Report for application EP 18194479,4, dated Feb. 4, 2019, 7 pages.

*Primary Examiner* — David Luo
(74) *Attorney, Agent, or Firm* — Cantor Colburn LLP

(57) ABSTRACT

This invention provides a frequency converter and bypass frequency conversion control system, and its switching control method, belonging to the technical field of motor drive control. The frequency converter of this invention accesses a network voltage signal with a corresponding first frequency and first phase, wherein the frequency converter is configured to be able to operate in tracking and synchronization mode, and in tracking and synchronization mode, the frequency converter tracks the first frequency and first phase of the network voltage signal in order to basically synchronize the second frequency and second phase of its output voltage signal with the first frequency and corresponding first phase of the network voltage signal. The frequency converter of this invention achieves simple, low cost, fast synchronization with good synchronism.

20 Claims, 2 Drawing Sheets

(51) Int. Cl.
*H02P 1/52* (2006.01)
*H02P 1/30* (2006.01)
*H02P 25/024* (2016.01)

(52) U.S. Cl.
CPC ............ *H02P 25/024* (2016.02); *H02P 27/04* (2013.01); *B66B 25/003* (2013.01)

(58) Field of Classification Search
USPC ........................................ 318/723, 720, 700
See application file for complete search history.

(56) References Cited

U.S. PATENT DOCUMENTS

| | | | |
|---|---|---|---|
| 5,889,922 A * | 3/1999 | Bufe | ................ B25B 21/02 |
| | | | 318/245 |
| 6,626,279 B2 | 9/2003 | Henkel et al. | |
| 6,634,463 B2 | 10/2003 | Spannhake et al. | |
| 7,221,121 B2 | 5/2007 | Skaug et al. | |
| 7,387,194 B2 | 6/2008 | Skolnick | |
| 8,183,813 B2 | 5/2012 | Jahkonen et al. | |
| 8,384,337 B2 | 2/2013 | Jahkonen | |
| 8,853,992 B2 | 10/2014 | Boom | |
| 9,120,647 B2 | 9/2015 | Liang et al. | |
| 9,425,713 B2 | 8/2016 | Haugland | |
| 2003/0000798 A1 | 1/2003 | Williams et al. | |
| 2013/0193890 A1 | 8/2013 | Kim | |
| 2014/0184132 A1 | 7/2014 | Siala et al. | |

FOREIGN PATENT DOCUMENTS

| | | |
|---|---|---|
| CN | 101219751 B | 9/2011 |
| CN | 102431876 A | 5/2012 |
| CN | 202414942 U | 9/2012 |
| CN | 203451024 U | 2/2014 |
| CN | 103872967 A | 6/2014 |
| CN | 102412782 B | 9/2014 |
| CN | 104062897 A | 9/2014 |
| CN | 105967035 A | 9/2016 |
| CN | 106006342 A | 10/2016 |
| DE | 102012108783 A1 | 11/2013 |
| JP | 3372126 B2 | 1/2003 |
| JP | 2015140231 A | 8/2015 |

* cited by examiner

FREQUENCY CONVERTER, BYPASS FREQUENCY CONVERSION CONTROL SYSTEM AND SWITCHING CONTROL METHOD THEREOF

FOREIGN PRIORITY

This application claims priority to Chinese Patent Application No. 201710831644.9, filed Sep. 15, 2017, and all the benefits accruing therefrom under 35 U.S.C. § 119, the contents of which in its entirety are herein incorporated by reference.

TECHNICAL FIELD

This invention belongs to the technical field of motor drive control and related to a frequency converter, a bypass frequency conversion control system and a passenger conveyor using this bypass frequency conversion control system, and a switching control method of the bypass frequency conversion control system.

BACKGROUND ART

AC motors are widely used as drive elements in systems, controlling the operation of the system by controlling the AC motor. Using an escalator as an example, it uses an AC motor as the drive motor, thereby driving escalator operation, wherein the operating speed of the stairs is influenced by the motor. Differentiated by motor control, escalators can be divided into working frequency escalators, full frequency conversion escalators, and bypass frequency conversion escalators. Here, bypass frequency conversion escalators are becoming increasingly accepted by users due to their advantages in terms of comfort and safety.

Using a bypass frequency conversion escalator as an example, it uses a bypass frequency conversion control system to drive and control the motor. When the motor is running, there is the problem of power supply switching. For example, in the start-up phase, a voltage signal output by a frequency converter is used to power and control the motor in linear acceleration to the normal speed; upon entering the normal operation phase (usually, this is operation at a basically constant normal speed), it is necessary to switch to using a network voltage signal to power and control the motor in normal speed operation. To achieve smooth switching, usually, a synchronizer will be set up in the bypass frequency conversion control system. This synchronizer can conduct sampling of the voltage signal output by the frequency converter and the network voltage signal, and monitor the synchronism between their frequencies and phases, until synchronism requirements are met, at which point the synchronizer issues an instruction to conduct switching, thereby achieving smooth switching and reducing the surge current, for a small shock produced by the escalator during this switching process.

DETAILS OF INVENTION

According to one aspect of this invention, it provides a frequency converter, which accesses a network voltage signal with a corresponding first frequency and first phase. The frequency converter is configured to be able to operate in tracking and synchronization mode, and in tracking and synchronization mode, the frequency converter tracks the first frequency and first phase of the network voltage signal in order to basically synchronize the second frequency and second phase of its output voltage signal with the first frequency and corresponding first phase of the network voltage signal.

According to a second aspect of this invention, it provides a bypass frequency conversion control system, comprising a first power supply circuit and second power supply circuit arranged in parallel, wherein the first power supply circuit can power and output the network voltage signal to a motor; the bypass frequency conversion control system also comprises: the frequency converter from the first aspect of this invention, set up on the second power supply circuit, thereby enabling the second power supply circuit to power and output the voltage signal output by the frequency converter to the motor; here, the frequency converter is also configured to: issue a switching instruction when it is determined that the second frequency and second phase of the output voltage signal are basically synchronized with the first frequency and first phase of the network voltage signal to achieve switching between network voltage signal power output corresponding to the first power supply circuit and voltage signal power output by the frequency converter corresponding to the second power supply circuit.

According to a third aspect of this invention, it provides a switching control method for the bypass frequency conversion control system, comprising the following steps: sampling the network voltage signal to acquire the corresponding first frequency and first phase and sampling the voltage signal output by the frequency converter to acquire the corresponding second frequency and second phase; causing the second frequency and second phase of the voltage signal output by the frequency converter to be basically synchronized with the first frequency of the network voltage signal and corresponding first phase by tracking the first frequency and first phase of the network voltage signal; and issuing a switching instruction when it is determined that the second frequency and second phase of the output voltage signal are basically synchronized with the first frequency and first phase of the network voltage signal.

According to a fourth aspect of this invention, it provides a passenger conveyor comprising a motor, wherein it also comprises the bypass frequency conversion control system of the second aspect of this invention.

The abovementioned features and operations of this invention will become clearer based on the following descriptions and drawings.

DESCRIPTION OF DRAWINGS

From the following detailed explanations of the drawings, the preceding and other purposes and advantages of this invention will become more complete and clear. Here, the same or similar elements are expressed by the same labels.

SPECIFIC EMBODIMENTS

Figure 1:
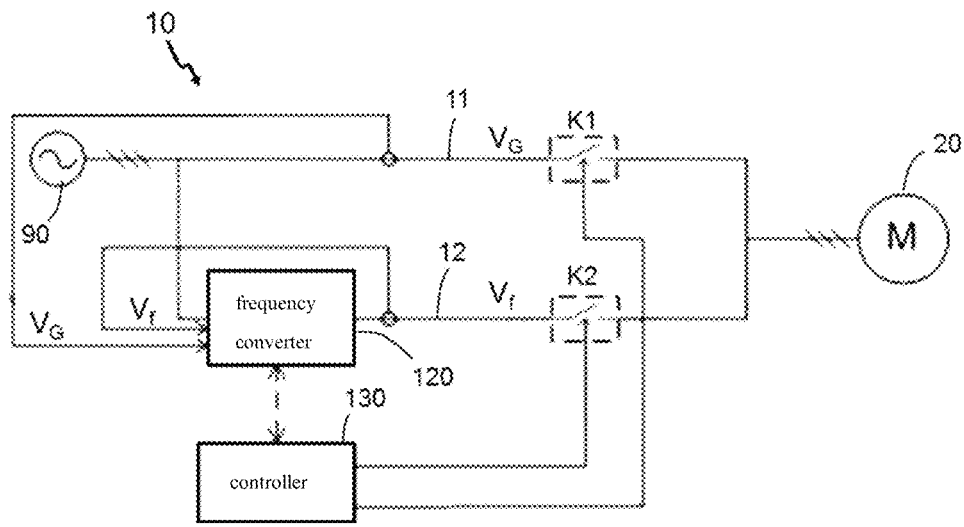
FIG. 1 is circuit structure diagram of a bypass frequency conversion control system according an embodiment of this invention.

Let us now give a more complete description of this invention in reference to the drawings. The drawings show exemplary embodiments of this invention. However, this invention can be achieved in numerous different forms, and it should not be understood to be limited to the embodiments set forth here. On the contrary, by providing these embodiments, this disclosure is made thorough and complete, and the concepts of this invention are wholly passed on to persons skilled in the art. In the drawings, the same labels refer to the same elements or components, so their descriptions will be omitted.

Certain block diagrams shown in the drawings are functional entities, and they do not necessarily correspond to independent physical or logical entities. These functional entities can be achieved in software form, or these functional entities can be achieved in one or more hardware modules or integrated circuits, or these functional entities can be achieved in different network and/or processor devices and/or microcontroller devices.

In this text, passenger conveyors include escalators and moving walkers. In the following embodiments, an escalator is used as an example to explain the passenger conveyor of this invention's embodiments, and the escalator's operating mode and its control are used to make exemplary illustrations. However, it should be understood that the frequency converter and bypass frequency conversion control system of the following embodiments of this invention can be applied, by analogy, to other systems with similar operating mode requirements, and the modifications that might need to be made, e.g.: for applicability, can be made known to a person skilled in the art under the guidance of the embodiments of this invention.

Figure 2:
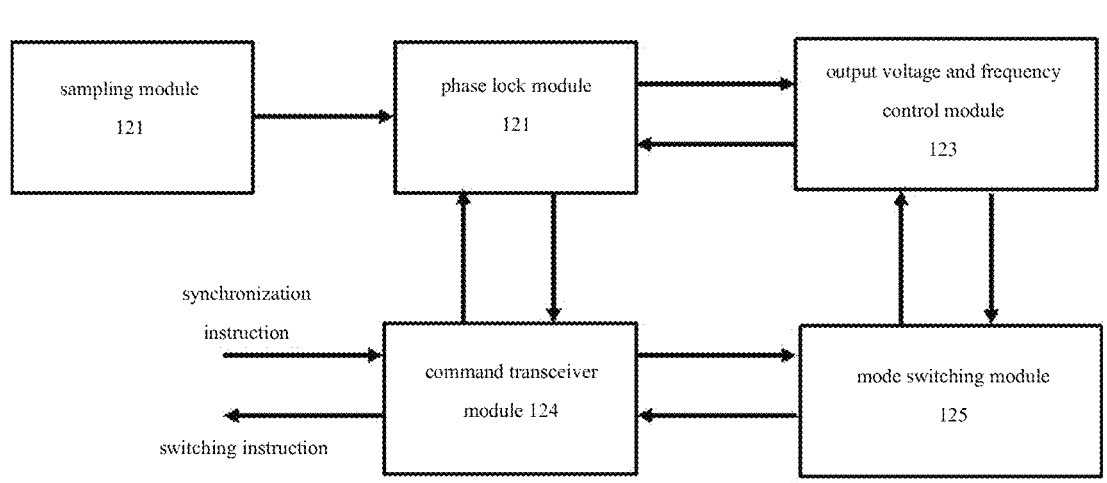
FIG. 2 is a module structure diagram of a frequency converter according to an embodiment of this invention.

FIG. 1 is circuit structure diagram of a bypass frequency conversion control system according an embodiment of this invention; FIG. 2 is a module structure diagram of a frequency converter according to an embodiment of this invention. Taking the bypass frequency conversion control system shown in FIG. 1 and applying it to an escalator of this invention's embodiment as an example, in conjunction with FIG. 1 and FIG. 2, the following provides an explanation of the frequency converter 120 and bypass frequency conversion control system 10 of this invention's embodiments.

As shown in FIG. 1, the bypass frequency conversion control system 10 is used to power the motor 20 and control its operation. Specifically, the motor 20 is a three-phase AC motor; its specific type and/or quantity are not limited. The bypass frequency conversion control system 10 comprises a first power supply circuit 11 and second power supply circuit 12 arranged in parallel, the first power supply circuit 11 and second power supply circuit 12 can simultaneously access network voltage signal $V_G$ from the network 90, and the first power supply circuit 12 [sic] and second power supply circuit 12 are set up with a controllable switch K1 and switch K2, respectively. Specifically, switch K1 and switch K2 can be contactors. Here, first power supply circuit 11 (e.g.: when switch K1 is connected) can power and output network voltage signal $V_G$ to the motor 20.

The second power supply circuit 12 is also equipped with a frequency converter 120, and the frequency converter 120 is serially arranged with switch K2. Therefore, switch K2 can control whether the second power supply circuit 12 can power and output voltage signal $V_f$ output by the frequency converter 120 to the motor 20. It should be noted that switch K1 and switch K2 are not to be connected at the same time, in order to avoid simultaneously inputting network voltage signal $V_G$ and voltage signal $V_f$ to the motor 20.

In terms of specifics, the connection and cut off times for switch K1 and switch K2 are controlled by a controller 130 in the frequency converter 120. The controller 130 is coupled to the frequency converter 120, and certain signals can be transmitted between these two, e.g.: the switching instruction described below. By controlling the movements of switch K1 and switch K2, the controller 130 can easily control the power output to the motor 20; in particular, it can control the switching of the power output of the bypass frequency conversion control system 10, e.g.: switching the power output of the bypass frequency conversion control system 10 from network voltage signal $V_G$ to voltage signal $V_f$, or switching from voltage signal $V_f$ to network voltage signal $V_G$. For the motor 20, its power supply switches from network voltage signal $V_G$ to voltage signal $V_f$, or from voltage signal $V_f$ to network voltage signal $V_G$.

From the network 90, the frequency converter 120 accesses, for example, a three-phase alternating current (e.g.: network voltage signal $V_G$). It is not limited to conducting frequency conversion processing of a three-phase alternating current, thereby outputting a frequency-converted AC signal. When voltage signal $V_f$ output by the frequency converter 120 drives and controls the motor 20, the operating speed of the motor 20 can be controlled by the frequency and voltage of voltage signal $V_f$, for easy, simple control.

In one embodiment, in order to achieve the smooth transition of this switching, the frequency converter 120 can also operate in tracking and synchronization mode. In tracking and synchronization mode, the frequency converter 120 tracks the first frequency $f_1$ and first phase $p_1$ of the network voltage signal $V_G$ to cause the second frequency $f_2$ and second phase $p_2$ of its output voltage signal $V_f$ to be basically synchronized with the first frequency $f_1$ and first phase $p_1$ of the network voltage signal $V_G$. To achieve this tracking and synchronization, the frequency converter 120 can collect the network voltage signal $V_G$ and voltage signal $V_f$ from the first power supply circuit 11 and second power supply circuit 12 in real time, thereby acquiring their current frequency and phase. The frequency converter 120 is also configured to issue a switching instruction, e.g.: to transmit a switching instruction to the controller 130, when it has been ascertained that this basic synchronization has been achieved (i.e.: when the second frequency $f_2$ and second phase $p_2$ of the voltage signal $V_f$ are basically synchronized with the first frequency $f_1$ of the network voltage signal $V_G$ and corresponding first phase $p_1$), and the controller 130 can go on to control switches K1 and K2 based on this switching instruction, e.g.:, control the cut off of K2 and the connection of K1, thereby achieving smooth switching, i.e.: switching from having the voltage signal $V_f$ of the motor 20 providing drive power to having the network voltage signal $V_G$ providing drive power. In particular, when applied to an escalator, the fact that the surge current generated by the switching process is small avoids escalator jitter, for a good passenger experience.

It should be noted that "basic synchronization" refers to their difference being less than or equal to a pre-set range of values acceptable to the user. For example, when the first frequency $f_1$ is 50 Hz, the absolute value of the difference between the first frequency $f_1$ and second frequency $f_2$ is less than or equal to 0.1-3 Hz (e.g.: 0.5 Hz), and the absolute value of the difference between first phase $p_1$ and second phase $p_2$ is less than or equal to 0.1-5 degrees (e.g.: 2 degrees). When better synchronism is required, a smaller pre-set value may be set.

In one embodiment, to be more specific, as shown in FIG. 2, a sampling module 121 is set up in the frequency converter 120. For one thing, it can sample the network voltage signal $V_G$, thereby acquiring the first frequency $f_1$ and first phase $p_1$ of the network voltage signal $V_G$, and for another thing, it can simultaneously sample the voltage signal $V_f$ output by the frequency converter 120, thereby acquiring the second frequency $f_2$ and second phase $p_2$ of voltage signal $V_f$. For example, the sampling module 121 can be achieved by using hardware such as a sampling resistor, and it can be set up inside or outside of the main body of the frequency converter 120. The sampling module 121 is capable of real-time sampling. Therefore, when network fluctuations lead to fluctuations in the first frequency $f_1$ and first phase $p_1$ of the network voltage signal $V_G$, as an example, the changes in the current first frequency $f_1$ and first phase $p_1$ are acquired in real time.

Continuing to look at FIG. 2, the frequency converter 120 is also equipped with a phase lock module 122 and output voltage and frequency control module 123. Here, in tracking and synchronization mode, the output voltage and frequency control module 123 causes the second frequency $f_2$ of the voltage signal $V_f$ output by the frequency converter 130 and the first frequency $f_1$ of the network voltage signal $V_G$ to tend toward synchronization, and when basic synchronization is achieved between the second frequency $f_2$ and first frequency $f_1$, it causes the second phase $p_2$ of the voltage signal $V_f$ output by the frequency converter and the first phase $p_1$ of the network voltage signal $V_G$ to tend toward synchronization; in tracking and synchronization mode, the phase lock module 122 ascertains that the second frequency $f_2$ and second phase $p_2$ of the output voltage signal $V_f$ are basically synchronized with the first frequency $f_1$ and first phase $p_1$ of the network voltage signal $V_G$;

to be more specific, in one embodiment, the phase lock module 122 can take the first frequency $f_1$ and corresponding first phase $p_1$ of the current network voltage signal $V_G$ received from the sampling module 121, as well as the second frequency $f_2$ and corresponding second phase $p_2$ of the current voltage signal $V_f$, and transmit them to the output voltage and frequency control module 123; first, the output voltage and frequency control module 123 compares the first frequency $f_1$ and second frequency $f_2$; if the absolute value of the difference between them is greater than a pre-set value (e.g.: 0.5 Hz), the output voltage and frequency control module 123 controls the second frequency $f_2$ of its voltage signal $V_f$ in a linear change tending toward the first frequency $f_1$, e.g.: a linear increase or linear decrease, until the absolute value of the difference between them is less than or equal to this pre-set value (e.g.: 0.5 Hz); next, the output voltage and frequency control module 123 compares the first phase $p_1$ and second phase $p_2$; if the absolute value of the phase difference between them is greater than a pre-set value (e.g.: 2 degrees), the output voltage and frequency control module 123 controls the second phase $p_2$ of its voltage signal $V_f$ in a change tending toward the first phase $p_1$, e.g.: adding 2 degrees every 10 ms or adding/subtracting 2 degrees every 10 ms, thereby achieving a trend toward synchronization between the frequency and phase of the current voltage signal $V_f$ and the frequency and phase of the current network voltage signal $V_G$. When these two comparisons are both less than or equal to their corresponding pre-set values, the voltage and frequency control module 123 feeds the comparison results back to the phase lock module 122. Thus, the phase lock module 122 ascertains that the second frequency $f_2$ and second phase $p_2$ of the output voltage signal $V_f$ are basically synchronized with the first frequency $f_1$ and first phase $p_1$ of the network voltage signal $V_G$, the phase lock module 122 conducts phase lock actions, and the output voltage and frequency control module 123 phase-lock outputs a voltage signal $V_f$ with a corresponding second frequency $f_2$ and second phase $p_2$, successfully achieving a phase lock, and issues switching instruction.

Continuing to look at FIG. 2, the frequency converter 120 also comprises a command transceiver module 124 and a mode switching module 125. The command transceiver module 124 at least receives (e.g.: receives from the controller 130) the synchronization instruction used to trigger the operation of the frequency converter 120 in tracking and synchronization mode, and it also receives switching instructions from the phase lock module 122. The command transceiver module 124 can also transmit the switching commands it receives to an external controller 130. Based on the synchronization instruction, the mode switching module 125 controls the frequency converter 120 in switching between different operating modes, e.g.: switching between tracking and synchronization mode and normal operating mode. Specifically, it can control the output voltage and frequency control module 123 in switching between different operating modes. In normal operating mode, the output voltage and frequency control module 123 can control the voltage and frequency of the voltage signal $V_f$ output by the frequency converter 120 based on an external control signal, and it can passively track the frequency of the network voltage signal $V_G$. The mode switching module 125 can be achieved through a state machine.

It should be noted that during this synchronization process in tracking and synchronization mode, even if the network voltage signal $V_G$ of the network 90 experiences fluctuations of varying degrees (e.g.: fluctuations and differences in the network voltage signal $V_G$ of different countries or regions), the frequency converter 120 can be configured to dynamically track the first frequency $f_1$ and first phase $p_1$ of the network voltage signal $V_G$, so that the second frequency $f_2$ and second phase $p_1$ of its output voltage signal $V_f$ are basically dynamically synchronized with the first frequency $f_1$ and first phase $p_1$ of the network voltage signal $V_G$. Therefore, even if the network voltage signal $V_G$ experiences fluctuations or the fluctuations are considerable, good synchronization can still be achieved.

The frequency converter 120 of these embodiments of this invention can actively track the frequency and corresponding phase of the network voltage signal $V_G$ by actively adjusting the frequency and corresponding phase of its output voltage signal $V_f$. It is not like the existing technologies, where synchronizers passively wait for their synchronization. (The wait time in this waiting process is long, it is ascertained based on the frequency converter output and the network frequency and phase, and the synchronization function can even be impossible when there are considerable fluctuations in the network voltage signal.) Therefore, not only is there good synchronism, synchronization can also be quickly achieved. In particular, when there are fluctuations in the network voltage signal $V_G$ or the fluctuations are considerable, after receiving the synchronization instruction, it is possible to quickly achieve frequency and phase synchronization between the voltage signal $V_f$ and the current network voltage signal $V_G$. Also, the frequency converter 120 of the embodiments of this invention can be achieved through modes such as software, for no added hardware costs, or no notable added hardware costs, with regard to existing frequency converters. A bypass frequency conversion control system 10 employing the frequency converter 120 of the embodiments of this invention embodiment can leave out the synchronizer used in today's technologies, vastly reducing costs. Also, the synchronization efficiency is high, the wait times for the switching actions between power outputs are small, and it is particularly well-suited to use in situations with considerable fluctuations in the network voltage signal $V_G$. In addition, due to the good synchronism and ease of achieving precise synchronization (e.g.: adjusting the aforementioned pre-set values), when the bypass frequency conversion control system 10 conducts switching between network voltage signal $V_G$ power output and voltage signal $V_f$ power output by the frequency converter 120 of the second power supply circuit 12, the surge current of the motor 20 is small and the jitter of the escalator stairs is smaller, for a better passenger experience.

It should be noted that the network voltage signal $V_G$ of the aforementioned embodiments is not limited to an AC voltage signal directly acquired from the network; it can also be an AC voltage signal of other types that can server as frequency converter input.

Figure 3:
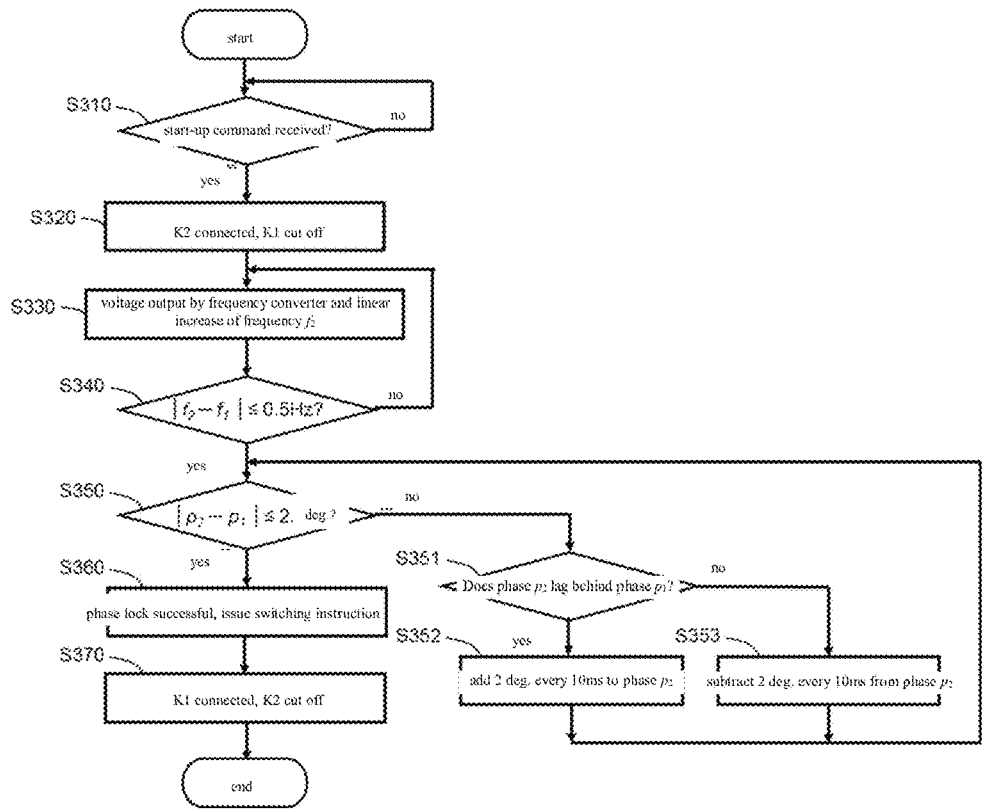
FIG. 3 is a flow diagram of the switching control method for a bypass frequency conversion control system according to an embodiment of this invention.

FIG. 3 is a flow diagram of the switching control method for a bypass frequency conversion control system according to an embodiment of this invention. Taking FIG. 1 and FIG. 3 together, they describe the switching control method for a bypass frequency conversion control system 10 of an embodiment of this invention.

Taking the application of a bypass frequency conversion control system 10 to an escalator as an example, first it is determined whether a power-on command has been received, i.e.: Step S310, until "yes" is determined. The power-on instruction is received by the controller 130, and based on this power-on instruction, the controller 130 connects K2 (ON) and cuts off K1 (OFF), i.e.: Step S320. At this time, power output for the motor 20 is conducted through the voltage signal $V_f$ output by the frequency converter 120.

Taking a step further, in Step S330, the voltage and frequency $f_2$ of the voltage signal $V_f$ output by the frequency converter increase linearly. Correspondingly, the speed of the motor 20 increases in a roughly linear fashion, and the operating speed of the escalator stairs also increases in a roughly linear fashion, completing the escalator start-up process. This start-up process features a good passenger experience.

Taking a step further, after the start-up process has been completed, it is necessary to switch from the power output corresponding to voltage signal $V_f$ to the power output corresponding to the network voltage signal $V_G$ of the first power supply circuit 11. Therefore, the process enters Step S340, determining whether the condition $|f_2-f_1| \leq 0.5$ Hz has been established. If it is determined that it "has not" been established, the process returns to Step S330, thereby causing the second frequency $f_2$ and the first frequency $f_1$ to constantly tend toward synchronization or equality; this is continued until it is determined that the condition "has" been established, and the process enters Step S350, determining whether the condition $|p_2-p_1| \leq 2$ degrees has been established.

If it is determined that this condition "has not" been established, the process enters Step S351, then goes on to determine whether phase $p_2$ lags behind phase $p_1$. If "yes", phase $p_2$ is adjusted, e.g.: adding 2 degrees every 2 ms. If "no", it means that phase $p_2$ is ahead of phase $p_1$, and phase $p_2$ is adjusted, e.g.: subtracting 2 degrees every 2 ms. This is continued until it is determined that the condition "has" been established in Step S350, ascertaining that frequency and phase synchronization has basically been achieved between the voltage signal $V_f$ output by the frequency converter 120 and the network voltage signal $V_G$, and the process enters Step S360, with the successful phase lock of the phase lock module 122 in the frequency converter 120, and the issuance of a switching instruction.

Taking a step further, in Step S370, the controller 130 can control switches K1 and K2 based on this switching instruction, i.e.: it can connect K1 (ON) and cut off K2 (OFF). At this time, the power output of the bypass frequency conversion control system 10 smoothly switches from the voltage signal $V_f$ output by the frequency converter 120 to the network voltage signal $V_G$. At this point, the switching control process has been basically completed.

It is to be understood that this switching control process has the advantages of high speed and high efficiency, and the surge current generated in the motor 20 by the switching is small. In addition, this switching control process is not limited to application after powering up. This switching control process can similarly be used when it is necessary to conduct a switching operation and the frequency and phase of voltage signal $V_f$ and network voltage signal $V_G$ are not synchronized.

Figure 4:
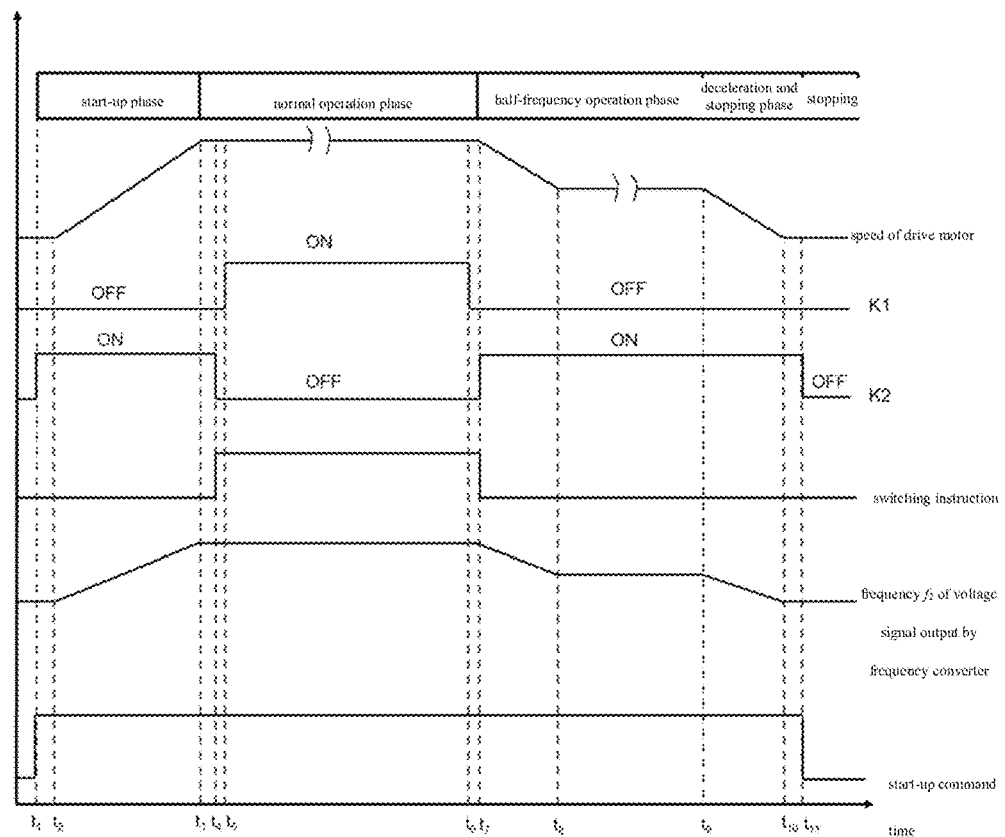
FIG. 4 is a control sequence diagram for the bypass frequency conversion control system of the embodiment in FIG. 1 when it is applied to an escalator.

The bypass frequency conversion control system 10 of the embodiment shown in FIG. 1 and the switching control method of the embodiment shown in FIG. 3 can be applied to the escalator of an embodiment of this invention. FIG. 4 shows a diagram of the control sequence when the bypass frequency conversion control system 10 of the embodiment shown in FIG. 1 is applied to an escalator. The escalator of this invention's embodiment can operate in the start-up phase, normal operation phase, half-frequency operation phase, and deceleration and stopping phase. FIG. 4 shows the power-on command, frequency $f_2$ of the voltage signal $V_f$ output by the frequency converter 120, switching instruction, state of switch K2, state of switch K1, and the speed of the motor.

As shown in FIG. 4, at the moment $t_1$, the power-on instruction triggers powering up (expressed as the switch from a low level to a high level). At this time, switch K2 is connected (ON); at the same time, switch K1 stays in cut off (OFF) mode, the switching instruction output by the frequency converter 120 remains at low level (indicating that switching is not required at this time), and preparations are made to increase the frequency $f_2$ of the voltage signal $V_f$ output by the frequency converter 120.

At the next moment $t_2$, the frequency $f_2$ of the voltage signal $V_f$ output by the frequency converter 120 begins to linearly rise, and the speed of the motor 20 also begins to gradually increase, until moment $t_3$, when the frequency $f_2$ of the voltage signal $V_f$ is basically equal to the frequency $f_1$ of the network voltage signal $V_G$. At this time, the speed of the motor 20 rises to its normal operating speed; also at this time, the frequency converter 120 begins operating in tracking and synchronization mode, and preparations are made for switching.

During the period of time from $t_3$ to $t_4$, Steps S350, S351, S352, S353 and S360 as shown in FIG. 3 are executed, until moment $t_4$, when phase locking is successful and a switching instruction is issued, i.e.: the switching instruction changes from low level to high level. At this time, correspondingly, switch K2 is cut off (OFF), and after a very short period of time, at moment $t_5$, K1 is connected (ON). Thus, during the period of time from $t_4$ to $t_5$, the power output of the bypass frequency conversion control system 10 is smoothly switched from the voltage signal $V_f$ to the network voltage signal $V_G$, the speed of the motor 20 basically remains unchanged, and there is little stair jitter.

During the period of time from $t_5$ to $t_6$, the escalator remains in the normal operation phase, and the motor 20 is driven by the network voltage signal $V_G$. During the period of time from $t_5$ to $t_6$, the frequency $f_2$ and phase $p_2$ of the voltage signal $V_f$ output by the frequency converter 120 basically remain unchanged.

At moment $t_6$, for example, if there are no passengers on the escalator stairs within a pre-set period of time, preparations are made to enter the half-frequency operation phase in order to reduce energy consumption. At this time, it is necessary to change from network voltage signal $V_G$ power supply to voltage signal $V_f$ power supply. At this time, the cut off of switch K1 (OFF) and the connection of switch K2 (ON) are begun, until moment $t_7$, when the switching control of switches K1 and K2 is completed. During this process, because the frequency $f_2$ and phase $p_2$ of the voltage signal $V_f$ output by the frequency converter 120 basically remain unchanged, it is not necessary to perform a synchronization operation like the one from the period of time from $t_3$ to $t_4$.

During the period of time from $t_7$ to $t_8$, the frequency converter 120 linearly reduces the frequency $f_2$ of its output $V_f$ from 50 Hz linear to 25 Hz, for example; correspondingly, the speed of the motor 20 gradually drops to roughly one-half of its original speed. Next, thing remain unchanged during the period of time from $t_8$ to $t_9$.

At moment $t_9$, the process begins to enter the deceleration and stopping phase. For example, after operating in the half-frequency operation phase for a given period of time, if no passengers have been detected boarding the escalator, it is necessary to make preparations for powering down and stopping. During the period of time from $t_9$ to $t_{10}$, the frequency converter 120 reduces the frequency $f_2$ of its output $V_f$ from 20 Hz linear to 0 Hz, for example; correspondingly, the speed of the motor 20 gradually drops to basically 0. At the next moment $t_{11}$, the power-on instruction triggers powering down, and at the same time, switch K2 changes to cut off (OFF).

The preceding provides an example of a control sequence diagram for the process of an escalator motor 20 going from powering on to powering down. It should be noted that if the process directly shifts into the normal operation phase during the half-frequency operation phase, a switching control process like that of the period of time from $t_3$ to $t_4$ needs to be performed again.

It should be noted that the elements disclosed and described in this text (including the flow diagrams and block diagrams in the drawings) point to the logical boundaries between elements. Nevertheless, based on software or hardware engineering practices, the described elements and their functions can be executed through computer-executable media on a machine, and the computer-executable media has a processor capable of executing program instructions stored thereon. The program instructions are a monolithic software structure, serving as an independent software module or a module using external programs, code, or services, or any combination of these. All of these execution schemes fall within the scope if this disclosure.

Even though the different unrestricted implementation schemes have specifically described components, the implementation schemes of this invention are not limited to these specific combinations. It is possible to use combinations of certain components or characteristics coming from any unrestricted implementation schemes with characteristics or components coming from any other unrestricted implementation schemes.

Even though a specific sequence of steps is shown, disclosed, and required, it should be understood that the steps can be executed in any sequence, separately or combined, unless noted otherwise, and shall still benefit from this disclosure.

The preceding description is exemplary and is not defined as being limited therein. This text discloses various unrestricted implementation schemes, yet a person having ordinary skill in the art will understand that any modifications and changes based on the preceding instructions shall fall within the scope of the dependent Claims. Therefore, it shall be understood that within the scope of the dependent Claims, disclosure content beyond that specifically disclosed may be implemented. For this reason, the dependent Claims shall be read to ascertain the true scope and content.

What is claimed is:

1. A frequency converter accessing a network voltage signal with a corresponding first frequency and first phase, wherein the frequency converter is configured to operate in tracking and synchronization mode, and in tracking and synchronization mode, the frequency converter tracks the first frequency and first phase of the network voltage signal in order to synchronize the second frequency and second phase of its output voltage signal with the first frequency and corresponding first phase of the network voltage signal;

wherein the frequency converter comprises;

a sampling module configured to sample the network voltage signal to acquire the first frequency and first phase, and to sample the voltage signal output by the frequency converter to acquire the second frequency and second phase;

an output voltage and frequency control module configured to cause the second frequency of the voltage signal output by the frequency converter to tend toward synchronization with the first frequency of the network voltage signal when in tracking and synchronization mode, and configured to cause the second phase of the voltage signal output by the frequency converter to tend toward synchronization with the first phase of the network voltage signal when synchronization between the second frequency and first frequency has been achieved; and a phase lock module configured to determine that the second frequency and second phase of the output voltage signal are synchronized with the first frequency and first phase of the network voltage signal when in tracking and synchronization mode.

2. The frequency converter according to claim 1, wherein the phase lock module is configured to: issue a switching instruction when it is determined that the second frequency and second phase of the output voltage signal are synchronized with the first frequency and first phase of the network voltage signal.

3. The frequency converter according to claim 2, wherein the frequency converter comprises:

a command transceiver module, configured to receive synchronization instructions used to trigger the operation of the frequency converter in tracking and synchronization mode and switching instructions sent from the phase lock module; and a mode switching module, configured to control the switching of the frequency converter between different operating modes based on the synchronization instruction.

4. The frequency converter according to claim 1, wherein the phase lock module is configured to: control the output voltage and frequency control module in the phase-locked output of a voltage signal with a corresponding second frequency and second phase when it is determined that the second frequency and second phase of the output voltage signal are synchronized with the first frequency and first phase of the network voltage signal.

5. The frequency converter according to claim 1, wherein the output voltage and frequency control module is configured: compare the second frequency and first frequency in tracking and synchronization mode, and cause the second frequency and first frequency to tend toward synchronization when the absolute value of the difference between the second frequency and first frequency is greater than a first pre-set value, until the absolute value of the difference between the second frequency and first frequency is less than or equal to the first pre-set value.

6. The frequency converter according to claim 5, wherein the output voltage and frequency control module is configured to:

compare the second phase and first phase in tracking and synchronization mode, and cause the second phase and first phase to tend toward synchronization when the absolute value of the difference between the second phase and first phase is greater than a second pre-set value, until the absolute value of the difference between the second phase and first phase is less than or equal to the second pre-set value.

7. The frequency converter according to claim 5, wherein the first pre-set value is set within a range of 0.1 Hz to 3 Hz, and the second pre-set value is set within a range of 0.1 to 5 degrees.

8. The frequency converter according to claim 1, wherein the phase lock module is configured to:

determine that the second frequency of the output voltage signal is synchronized with the first frequency of the network voltage signal when the absolute value of the difference between the second frequency and first frequency is less than or equal to the first pre-set value, and determine that the second phase of the output voltage signal is synchronized with the first phase of the network voltage signal when the absolute value of the difference between the second phase and first phase is less than or equal to the second pre-set value.

9. The frequency converter according to claim 1, wherein the frequency converter is also configured to dynamically track the first frequency and first phase of the fluctuating network voltage signal in order to cause the second frequency and second phase of its output voltage signal to be dynamically synchronized with the first frequency and first phase of the network voltage signal.

10. A bypass frequency conversion control system, comprising a first power supply circuit and second power supply circuit arranged in parallel, wherein the first power supply circuit can power and output the network voltage signal to a motor, the bypass frequency conversion control system further comprising;

the frequency converter according to claim 1, set up on the second power supply circuit, thereby enabling the second power supply circuit to power and output the voltage signal output by the frequency converter to the motor;

wherein the frequency converter is also configured to:
issue a switching instruction when it is determined that the second frequency and second phase of the output voltage signal are synchronized with the first frequency and first phase of the network voltage signal to achieve switching between the network voltage signal power output corresponding to the first power supply circuit and the voltage signal power output by the frequency converter corresponding to the second power supply circuit.

11. The bypass frequency conversion control system according to claim 10, further comprising:

a first switch, set up on the first power supply circuit configured to control whether the first power supply circuit can power and output the network voltage signal to a motor;

a second switch, set up on the second power supply circuit and configured to control whether the second power supply circuit can power and output the voltage signal output by the frequency converter to the motor; and a controller, configured to connect the first switch and cut off the second switch when the switching instruction is received from the frequency converter.

12. The bypass frequency conversion control system according to claim 10, wherein the frequency converter is also configured to:

simultaneously sample the network voltage signal on the first power supply circuit and the voltage signal output by the frequency converter.

13. The bypass frequency conversion control system according to claim 10, wherein the first switch and/or second switch is a contactor.

14. A switching control method for the bypass frequency conversion control system according to claim 10, the method comprising:

sampling the network voltage signal to acquire the corresponding first frequency and first phase and sampling the voltage signal output by the frequency converter to acquire the corresponding second frequency and second phase;

causing the second frequency and second phase of the voltage signal output by the frequency converter to be synchronized with the first frequency and corresponding first phase of the network voltage signal by tracking the first frequency and first phase of the network voltage signal; and issuing a switching instruction when it is determined that the second frequency and second phase of the output voltage signal are synchronized with the first frequency and first phase of the network voltage signal.

15. The switching control method according to claim 14, wherein the causing comprises:

comparing the second frequency and first frequency, and causing the second frequency and first frequency to tend toward synchronization when the absolute value of the difference between the second frequency and first frequency is greater than a first pre-set value, until the absolute value of the difference between the second frequency and first frequency is less than or equal to the first pre-set value, and only then determining that the second frequency and the first frequency have achieved basic synchronization.

16. The switching control method according to claim 15, wherein the comparing comprises:

after determining that the second frequency and the first frequency have achieved synchronization, comparing the second phase and first phase, causing the second phase and first phase to tend toward synchronization when the absolute value of the difference between the second phase and first phase is greater than a second pre-set value, until the absolute value of the difference between the second phase and first phase is less than or equal to the second pre-set value, and only then determining that the second phase and the first phase have achieved synchronization.

17. The frequency converter according to claim 15, wherein the first pre-set value is set within a range of 0.1 Hz to 3 Hz, the second pre-set value is set within a range of 0.1 to 5 degrees.

18. The frequency converter according to claim 14, further comprising connecting the first switch and cutting off the second switch based on the switching instruction.

19. The switching control method according to claim 14, wherein, during the synchronization, the frequency converter dynamically tracks the fluctuating first frequency and first phase of the network voltage signal, and causes the second frequency and second phase of its output voltage signal to be dynamically synchronized with the first frequency and first phase of the network voltage signal.

20. A passenger conveyor comprising a motor, comprising the bypass frequency conversion control systems according to claim 10.

\* \* \* \* \*